(12) United States Patent
Fraize et al.

(10) Patent No.: US 9,215,208 B2
(45) Date of Patent: Dec. 15, 2015

(54) NETWORK ATTACK OFFENSIVE APPLIANCE

(71) Applicant: THE KEYW CORPORATION, Hanover, MD (US)

(72) Inventors: John Fraize, Northborough, MA (US); Darrell Covell, Clarksville, MD (US); Thomas Williams, Arnold, MD (US); Stephanie Tomanek, Ellicott City, MD (US)

(73) Assignee: The KEYW Corporation, Hanover, MD (US)

( * ) Notice: Subject to any disclaimer, the term of this patent is extended or adjusted under 35 U.S.C. 154(b) by 14 days.

(21) Appl. No.: 13/966,710

(22) Filed: Aug. 14, 2013

(65) Prior Publication Data

US 2014/0283064 A1 Sep. 18, 2014

Related U.S. Application Data

(60) Provisional application No. 61/684,538, filed on Aug. 17, 2012.

(51) Int. Cl.
*H04L 29/06* (2006.01)

(52) U.S. Cl.
CPC ........ *H04L 63/0227* (2013.01); *H04L 63/1416* (2013.01); *H04L 63/1441* (2013.01)

(58) Field of Classification Search
CPC ............ H04L 63/1416; H04L 63/1441; H04L 63/0227
USPC ......................................................... 726/23
See application file for complete search history.

(56) References Cited

U.S. PATENT DOCUMENTS

| 7,565,482 | B1 * | 7/2009 | Rangarajan et al. .......... 711/108 |
|---|---|---|---|
| 7,657,937 | B1 * | 2/2010 | Kumar ............................ 726/23 |
| 7,739,445 | B1 * | 6/2010 | Venkatachary ........ G11C 15/00 365/49.17 |
| 8,352,829 | B1 * | 1/2013 | Pathakota ...................... 714/758 |
| 2002/0131364 | A1 * | 9/2002 | Virtanen et al. ............... 370/230 |
| 2002/0145981 | A1 * | 10/2002 | Klinker et al. ................ 370/244 |
| 2004/0030927 | A1 * | 2/2004 | Zuk ................................ 713/201 |
| 2005/0044422 | A1 * | 2/2005 | Cantrell et al. ............... 713/201 |
| 2006/0005043 | A1 * | 1/2006 | Hsueh ........................... 713/188 |
| 2006/0161983 | A1 * | 7/2006 | Cothrell et al. ................. 726/23 |
| 2012/0026881 | A1 * | 2/2012 | Zuk et al. ...................... 370/235 |
| 2012/0102562 | A1 * | 4/2012 | Chokshi et al. ................. 726/12 |
| 2012/0240185 | A1 * | 9/2012 | Kapoor et al. ..................... 726/1 |
| 2013/0212689 | A1 * | 8/2013 | Ben-Natan et al. ............. 726/26 |
| 2013/0291101 | A1 * | 10/2013 | Karasaridis ..................... 726/22 |
| 2014/0090011 | A1 * | 3/2014 | Howe ................................ 726/1 |

OTHER PUBLICATIONS

Wu, Zhenyu et al., "Swift: A Fast Dynamic Packet Filter", NSDI '08: 5th USENIX Symposium on Networked Systems Design and Implementation, pp. 279-292.*

* cited by examiner

*Primary Examiner* — Michael Pyzocha
(74) *Attorney, Agent, or Firm* — Morrison & Foerster LLP

(57) ABSTRACT

A network system for launching a cyber-offensive countermeasure to improve network security is provided. For example, a system that enables launching a cyber-offensive countermeasure on a network may include a receiving section that receives packets routed on the network and analyzes the received packets to detect an attack directed toward a device on the network when the attack is external to the device, an editing section that edits the received packets, and a transmitting section that transmits the edited packets on the network.

16 Claims, 5 Drawing Sheets

FIGURE 7

NETWORK ATTACK OFFENSIVE APPLIANCE

CROSS REFERENCE TO RELATED APPLICATIONS

This application claims the benefit of U.S. Provisional Patent Application No. 61/684,538, filed Aug. 17, 2012, the entirety of which is incorporated herein by reference for all purposes as if put forth in full below.

BACKGROUND

1. Field

This application relates to cyber security and cyber warfare.

2. Discussion of the Related Art

The internet was created as a "dumb network" with "intelligent devices" and as such traffic that flows through is treated as equal. The design of the internet is one reason attacks are so prevalent today. Today's systems are not designed to implement counter measures against cyber-attacks. Current cyber-security programs provide protections rather than the ability to fight back against attackers; which is very different from cyber security programs such as anti-virus and anti-malware programs and internet security programs, which are protection- and prevention-based. There is not one single system that allows for full protection of a network either private or public. While most systems today are defensive and reactive in nature and must rely on known issues to protect against such attacks, they must also implement multiple defenses as not one system solves all these problems. Dropped packets are a source of critical concern in defending one's network due to technology and speed limitations.

Major limitations in filtering traffic exist as well as the ability to attribute an attack(s). Other limitations are due to the fact that most software protection is not based on behavioral information but rather on known signatures. Whereas a blended solution of signature and behavior would be advantageous. Additionally, most current approaches to network forensics processing (programs like SNORT®) were designed when multi-core machines were not available to the general computing community. Multi-cores can run multiple instructions at the same time. Software needed to be open to parallel computing to take advantage of this. The performance gained depends heavily on software algorithms used. Parallelization of software has been problematic for developers. Therefore, as with most software that was migrated to multi core computers, the software simply shared the processing, but the disadvantage of a multi core system trying to share the same memory bus was never truly understood.

SUMMARY

A network attack offensive appliance that provides a platform from which cyber-offensive countermeasures may be launched is disclosed. Specifically, disclosed are the computer and server systems deploying the cyber-offensive platform and the methods by which the cyber-offensive platform operates.

A system that enables launching of a cyber-offensive countermeasure on a network is provided. The system may comprise a number of parts, including, but not limited to, a receiving section that receives packets routed on the network and analyzes the received packets to detect an attack directed toward a device on the network when the attack is external to the device, an editing section that edits the received packets, and a transmitting section that transmits the edited packets on the network.

A method of providing a cyber-offensive countermeasure on a network is provided. The method may be implemented on a computer-readable medium on a server connected to the network. The method may also be used to implement a network platform from which a cyber-offensive countermeasure can be launched. The method may comprise a number of steps, including, but not limited to, capturing packets routed on the network, analyzing the captured packets to detect an attack directed toward a device on the network when the attack is external to the device, editing the captured packets, and transmitting the edited packets on the network.

A cyber-offensive security system that enables a network platform to launch a cyber-offensive countermeasure is provided. The system may comprise a number of components, including, but not limited to, a first network component that receives packets routed on the network and analyzes the received packets to detect an attack directed toward a device on the network when the attack is external to the device, a second network component that edits the received packets, and a third network component that transmits the edited packets on the network.

A computer-readable medium storing instructions for a computer including a processor is provided. The instructions, when executed, make the computer perform a number of steps, including, but not limited to, capturing packets routed on the network, analyzing the captured packets to detect an attack directed toward a device on the network when the attack is external to the device, editing the captured packets, and transmitting the edited packets on the network.

BRIEF DESCRIPTION OF THE DRAWINGS

FIG. 7 illustrates an example of a screenshot of the cyber-offensive platform.

DETAILED DESCRIPTION

Figure 1:
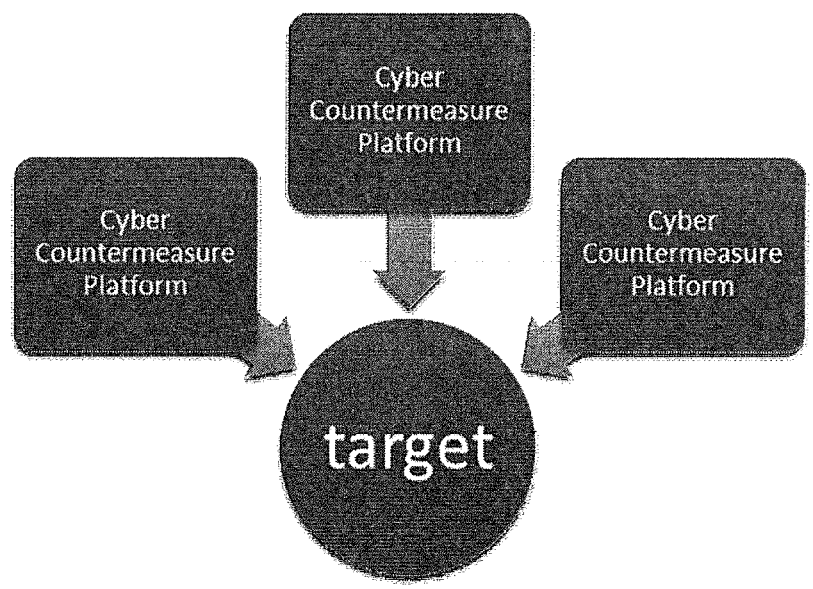
FIG. 1 illustrates an example of a clustered attack against a target.

While the internet has become a necessary tool for personal and business communications, management of assets, and a means of doing business, it has also emerged into a platform vulnerable to security threats ranging from innocent disclosure of personal information to nefarious uses that include unlawful activity, fear mongering, and the potential to reach into cyber warfare. Attribution of such actors has been difficult to achieve due to the way the Internet Protocol ("IP") is designed. IP, the protocol for relaying network packets, was designed only to send and receive packets. IP does not police the data traversing the internet and has no state of path of prior packets. The only thing the IP ensures is that the IP packet header is error-free.

Disclosed herein is a platform from which cyber-offensive countermeasures can be launched. Further disclosed is a method of attributing attacks to sources which can then produce an automated or semi-automated response whereby the attacker is either slowed down, watched or is shut down using either an inline or stealth attack. This cyber-offensive platform and the method by which the platform operates can serve as a selective surgical content transmuter, as it has the ability to change content from one thing into another (see FIG. 6). The platform is fast enough to detect, and change the content while in-route. Existing tools are not able to get it done fast enough.

The cyber-offensive platform may provide: situational awareness, which discovers malicious behavior earlier and external to the target with enhanced information with respect to sources; an ability to anticipate an attack no matter where on Earth the attack originated; early detection and awareness of attacks allows a greatly expanded set of response options that may suppress and/or neutralize the offensive sources; multiple sensors share information between themselves and can act similar to a "cyber-armored division;" the ability to deploy more devices with a sensor grid that has a finer mesh, which like a spider web will vibrate when any of the cyber transducers has detected a person of interest and the grid can then proactively react in concert with its various components; monitoring of nefarious persons of interest, their attacks and their sources; full data analysis at line rates; and unique hash algorithms, the design of such which significantly increases the speeds at which the system operates.

The cyber-offensive platform may additionally provide: hyper threading, which is dealt with by the use of high-end multi core processors versus DSP. Hard ware engineers use the term "DSP" to mean digital signal processors and algorithm developers use the term to mean digital signal processing. Either definition is intended herein as applicable and known in the art. DSPs are designed to perform mathematical calculations needed in digital processing, whereas CPU's were typically used to handle data manipulation. With multi-core and hyper-threading, DSP tasks can be done just as rapidly as dedicated DSP's, which keep costs down significantly.

The platform can reside either in-line or in stealth mode (no MAC address) while functioning as monitoring or implementing countermeasures. The platform has the ability to analyze and discriminate traffic with prior-to knowledge, which means a user has full view of information being sent over the internet to be able to establish insight into potentially threatening traffic much earlier. This allows a user to intercept issues and unwanted traffic prior to reaching critical locations. The network security system or platform according to the present disclosure may combine a blend of signature and behavioral-based protections that characterize both known and unknown anomalies. The blend of protections greatly expands the ability to proactively "find the needle in the haystack." The platform has the ability to track full payloads at line rate in real time; an ability to respond to cyber-attacks by performing flow termination and/or jamming, botnet capture, disinformation, DNS request capture and rewrite of DNS requests to reroute traffic away from botnet or a combination thereof, as dictated or configured by the security analyst in real time.

Uses of the platform may include: critical governmental and commercial infrastructure protection; federal and state governments; law enforcement; military applications; research and development activities; educational and academic uses; cloud computing security and other high-level security situations. Other uses include cyber-offensive NETA security, monitoring of criminal or illegal activity or behavior such as terrorism, child pornography, human trafficking, drug trafficking, distribution of firearms, missing and exploited children rings, cyber-bullying, and other radical environments, and national defense.

Frequency of penetration attempts are given scores based on user defined criteria for alert status of anomalous behavior; where course of action is based upon on score criteria. The threat matrix, when different number values are feed into correlation engine a threat value is assigned that indicates low, medium, high that is used for further assessment (on a human level). The software is customizable to subject area expert's needs.

The platform may be implemented through the following: a cyber-offensive security system for launching a cyber-offensive countermeasures platform, the cyber-offensive security system comprising a packet information retrieval system; COTS (commercial off-the-shelf) based hardware; a high speed full packet capture card(s) that capture the full payload at line rate at speeds of at least about 1/10/100, 10 GigE, 40 GigE, and 1 OOGigE, OC-12, OC-48, OC-192; capture card having 2 1 OGig ports for an effective speed of 40 Gig line rate capture; appliance size from 1 U shorty through 4U box; memory/RAM; hard drive disks and solid state drives; software modules with GUI user interface; multiple sensors; multiple core processors, each having their database of search words and filters; a server, a computer network, including SONET, Ethernet, internet, intranet, peer to peer and the like, and a user interface, or any combination thereof. However, the implementation is not limited to the above and may be implemented using any equivalent hardware and software as long as the implemented system can perform the core features that are claimed.

The cyber-offensive system may implement a method where the cyber-offensive security system discovers a malicious behavior external to the target; anticipates an attack from its origin anywhere on the internet; an ability to suppress and/or neutralize the attack; shares information between said multiple sensors; deploying more devices when a threat target of interest is detected; proactively reacting to any detected threat target; monitoring persons of interest, their attacks and their sources; analyzing all the data at line speed; and utilizing a hash algorithm which results in increased speeds of the system, and wherein the response to a threat is offensive and intercepts unwanted internet traffic prior to the traffic reaching critical locations.

Other features of the cyber-offensive security system may include: the counter-measure response may comprise flow termination, jamming, botnet capture, disinformation, DNS request capture, and rewriting of DNS requests to reroute traffic away from an identified botnet; botnet capture; taking control of a botnet threat to turn it into an attacker of the offending botnet controller; the database of search key words and filters are not shared by any of the multiple cores; full payloads are tracked at line rate in real time; the system can be configured by a security analyst in real time; and/or wherein the cyber-offensive countermeasures platform is deployed independently or as a clustered detector on the Internet.

The cyber-offensive system may include a computer-implemented method which attributes attacks to sources and producing an automated or semi-automated response, said method comprising: discovering malicious behavior external to the target; anticipating an attack from its origin anywhere on the internet; ability to suppress and/or neutralize the attack; shares information between said multiple sensors; deploying more devices when a threat target of interest is detected and then proactively reacting to the threat target; monitoring persons of interest, their attacks and their sources; analyzing all the data at line speed; and utilizing a hash algorithm which results in increased speeds of the system, and wherein the response to a threat is offensive and intercepts unwanted internet traffic prior to the traffic reaching critical locations.

The method of providing cyber-offensive countermeasures may also include, but not limited to, a response which comprises flow termination, jamming, botnet capture, disinformation, DNS request capture, and rewriting of DNS requests to reroute traffic away from an identified botnet; botnet capture; taking control of a botnet threat to turn it into an attacker of the offending botnet controller; the database of search key words and filters are not shared by any of the multiple cores; full payloads are tracked at line rate in real time; the system can be configured by a security analyst in real time; and/or wherein the cyber-offensive countermeasures platform is deployed independently or as a clustered detector on the internet.

The cyber-offensive system may be implemented through an appliance which provides a platform from which cyber-offensive countermeasures may be launched. The appliance, tangibly embodied in a computer readable medium, using the hardware and software described herein, implements a computer-implemented method which attributes attacks to sources and producing an automated or semi-automated response, said method comprising: discovering malicious behavior external to the target; anticipating an attack from its origin anywhere on the internet; ability to suppress and/or neutralize the attack; shares information between said multiple sensors; deploying more devices when a threat target of interest is detected and then proactively reacting to the threat target; monitoring persons of interest, their attacks and their sources; analyzing all the data at line speed; and utilizing a hash algorithm which results in increased speeds of the system, and wherein the response to a threat is offensive and intercepts unwanted internet traffic prior to the traffic reaching critical locations.

The appliance, tangibly embodied in a computer readable medium, implements a method using the hardware and software described herein, includes, but is not limited to a response which comprises flow termination, jamming, botnet capture, disinformation, DNS request capture, and rewriting of DNS requests to reroute traffic away from an identified botnet; botnet capture; taking control of a botnet threat to turn it into an attacker of the offending botnet controller; the database of search key words and filters are not shared by any of the multiple cores; full payloads are tracked at line rate in real time; the system can be configured by a security analyst in real time; and/or wherein the cyber-offensive countermeasures platform is deployed independently or as a clustered detector on the internet.

Below described are various aspects of an working example for the cyber-offensive countermeasure system, platform, appliance and method of implementing the same, according to the present disclosure.

The Cyber-Offensive Platform

The cyber-offensive platform can be deployed independently or as a clustered detector on the internet. When deployed as a cluster, the ability to detect a trigger by one system then other systems alerted can carry out the response such as flow termination, jamming, botnet capture, disinformation, and more or a combination thereof. By allowing other systems to carry out the response, the original detection device can continue to operate effectively as a monitor. The system is low cost and can even be deployed as code running on a smart phone. Therefore, the economics of a large cluster is possible as seen in FIG. 1.

The Receive Section

Figure 2:
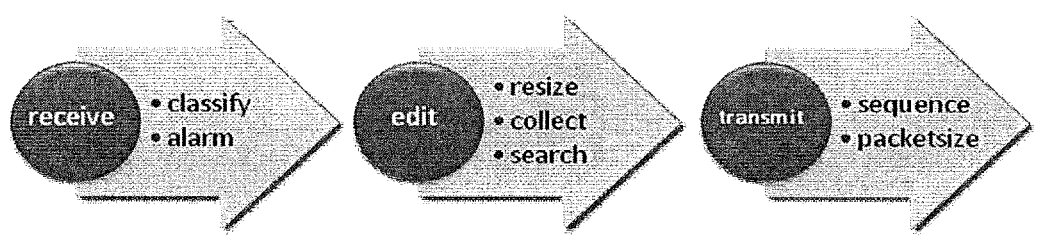
FIG. 2 illustrates an example of the processing stages in a single detection unit.

FIG. 2 is a graphic which represents the processing stages of a single platform. The receive section monitors general traffic on the network to detect any malicious behaviors and anticipates an attack based on the monitored data.

Figure 3:
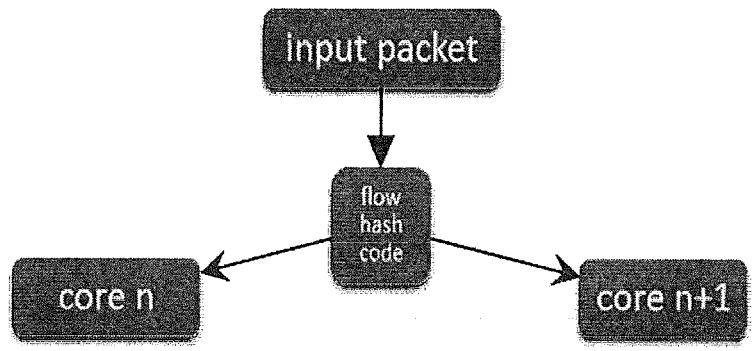
FIG. 3 illustrates an example of dividing and distributing input traffic to multiple threads.
Figure 4A:
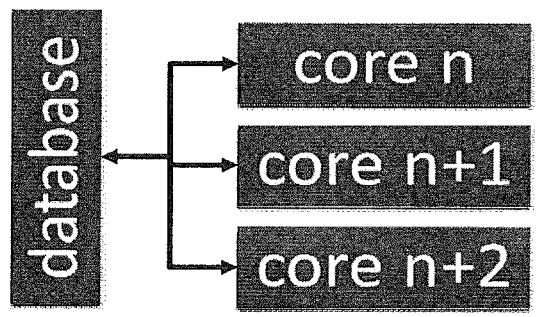
FIG. 4a illustrates the industry standard of a shared memory database.
Figure 4B:
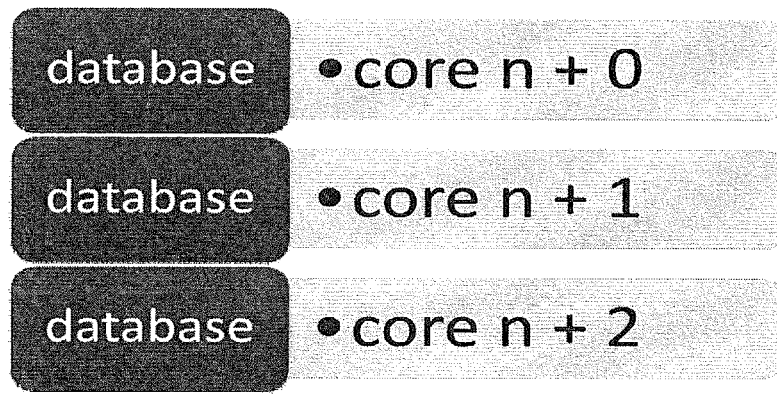
FIG. 4b illustrates an example of the cyber-offensive platform having a non-shared memory database, where each core has its own fast copy.

The receive section of the platform sorts many packets into hash bins of network flows, thus classifying the traffic into simultaneous conversations. This receive section operates in more than one core on a machine, so that there is more than one instance of receives and edit sections running at the same time, as shown in FIG. 3. The graphic in FIG. 3 depicts how the input traffic is distributed to multiple receive threads in industry standard systems. In the industry, the known solution is to "break up the work" as shown in FIG. 4a. However, in the cyber-offensive platform, the filter or search key words, or "database" is not shared by any of the other cores. Each core has its own complete database, and thus keeps down the memory bus accesses and inner-core signaling, which allows the platform to be faster than currently-available systems as shown in FIG. 4b.

Each core having its own database speeds up processing for several reasons. There is no need to share signals on access to this data with other cores. This means that software does not have to use "lock" on access to the database. Because the core has exclusive access to the records, it does not have any of the overhead on access to a shared resource. In caching, each core has its own 'sandbox of records' to deal with, thus it is more likely to keep the data in cache and result in speeding up access times.

The Edit Section

Figure 5A:
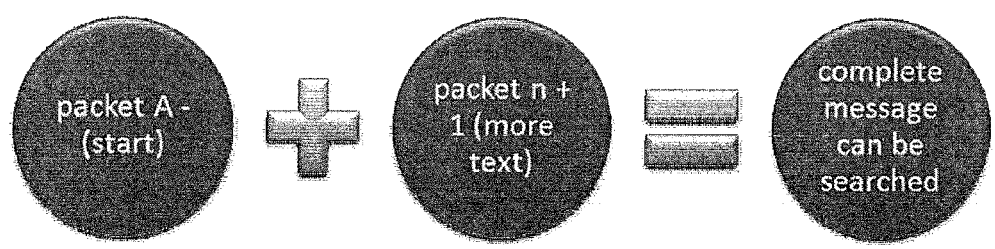
FIG. 5a illustrates an example of a graphical representation of the cyber-offensive platform.
Figure 5B:
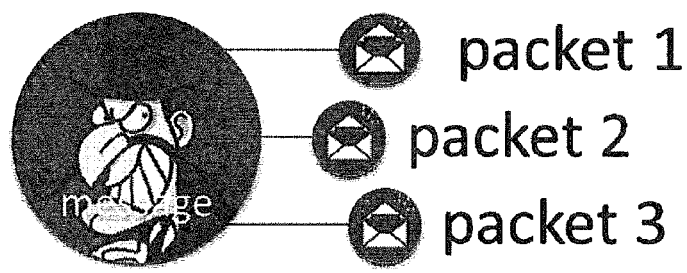
FIG. 5b illustrates an example of a cartoon depicting the editing function of the cyber-offensive platform.

The edit section is responsible for the collection of the packets into messages and the changing of the information. For example, an email from a sender is broken up into pieces (packets) as it traverses the network (the sender having no control over the formation of packets, it is a function of how the internet works). For the edit section to make sense of the passing data, the program re-constitutes the packets into some part of the original message. For example, as shown in FIG. 5a, if an email was sent which contained the following text: "The leader's name is Snidely Whiplash"; but the message would have been broken up into two packets where the first packet contained the words, "The leader's name is Snidely" and the second packet would have had the word, "Whiplash." Therefore, if the edit code was looking to change the name of the leader and was instructed to look for the text "Snidely Whiplash," the search would fail using the currently-available technologies, i.e., looking at separate packets one at a time. However, the claimed platform collects the packet pieces before it looks for the match.

The Transmit Section

Figure 6:
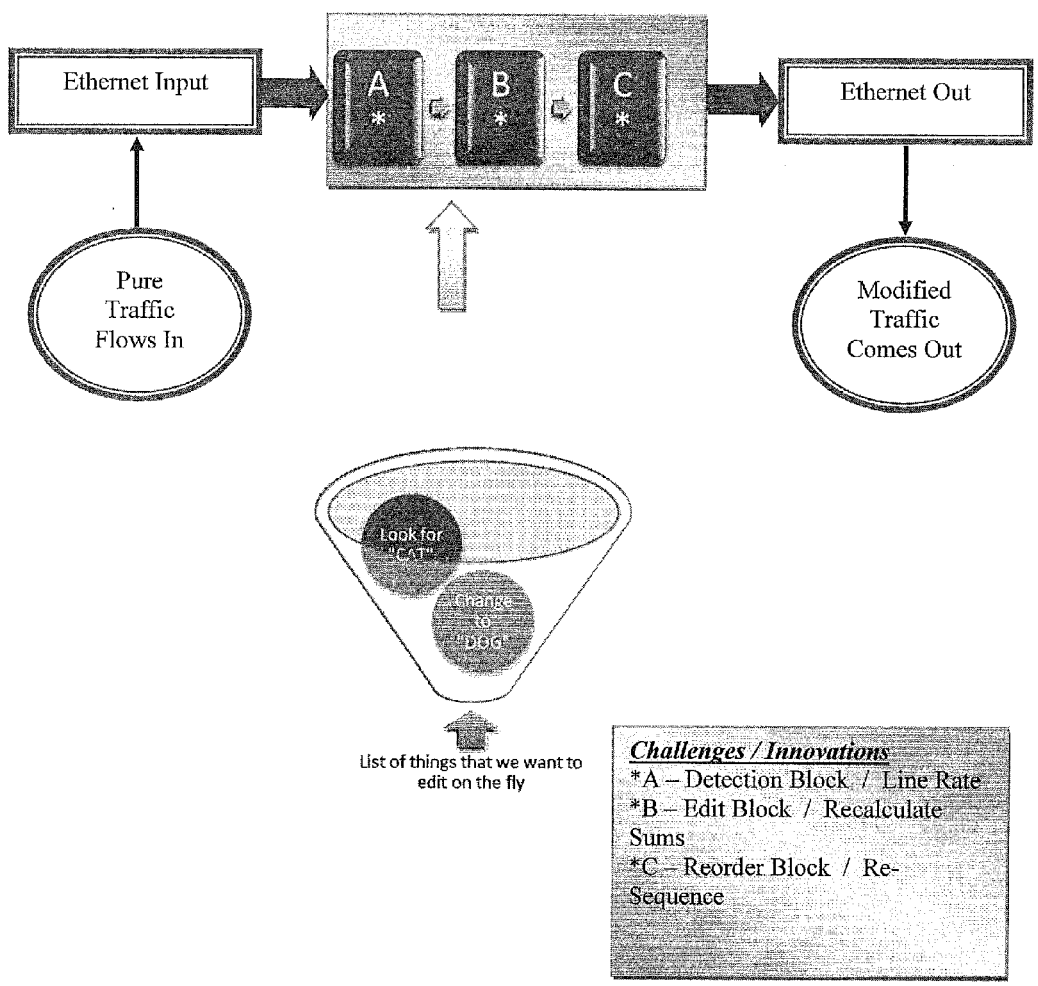
FIG. 6 illustrates an example of a flow chart of the cyber-offensive platform.

The transmit section is responsible for reordering the transmission control protocol ("TCP") sequence numbers and checksums so that the traffic will be properly received. If modification is required, one process required is for the platform to present the data back on the network in a way that makes it look it has not been modified, as shown in FIG. 6. In other words, the cyber-offensive platform will break up the collected and changed message in a way that makes it look like the data was not modified. Another advantageous aspect of the cyber-offensive platform is that the program will remember the original collected message as to how it was broken up, and try to mimic the original collected message on the output, but at the same time, the program is recalculating the TCP sequence numbers and checksums.

Figure 7:
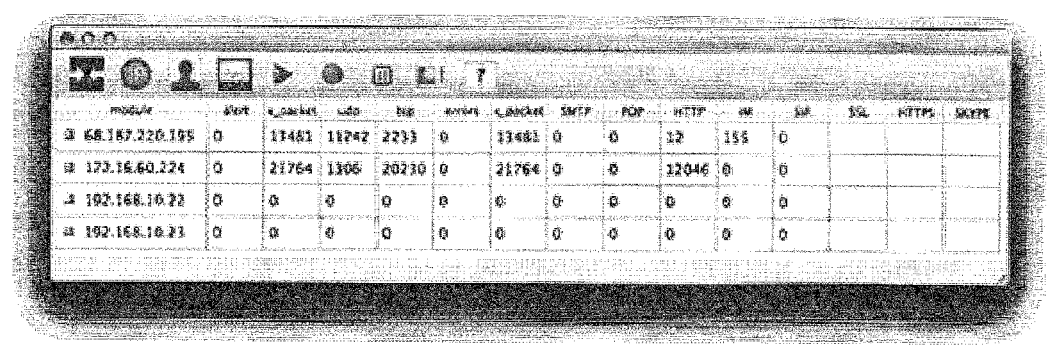

A screenshot is shown in FIG. 7, which depicts the listing of several modules, packet tracking, errors, and so forth, as described herein. The screenshot exemplifies the ability of the program to provide a user with an aggregate of information for ease of monitoring as described herein.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate systems may be performed by the same system, and functionality illustrated to be performed by the same system may be performed by separate systems. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in multiple units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

What is claimed is:

1. A system that enables launching a cyber-offensive countermeasure on a network, the system comprising:
   a memory,
   multiple processors, at least one of the multiple processors being configured to enable the system to:
   receive packets routed on the network and analyze the received packets to detect an attack directed toward a device on the network when the attack is external to the device,
   divide the received packets into at least a first thread associated with a first one of the multiple processors and a second thread associated with a second one of the multiple processors,
   edit the received packets, and
   transmit the edited packets on the network, wherein
   the first one of the multiple processors is associated with a database of filters used to analyze the packets and the database of filters is not shared by the second one of the multiple processors.

2. The system of claim 1, wherein at least one of the multiple processors is configured to enable the system to edit packet content to suppress an attack detected by the receiving section.

3. The system of claim 2, wherein at least one of the multiple processors is configured to enable the system to collect the packets, deconstruct the packets, and reconstruct the packets before editing packet content.

4. The system of claim 2, wherein at least one of the multiple processors is configured to enable the system to, after editing packet content, further edit packet content so that the editing of packet content is not recognizable by the network.

5. The system of claim 4, wherein at least one of the multiple processors is configured to enable the system to further edit packet content by reordering transmission control protocol (TCP) sequence numbers and checksums.

6. The system of claim 1, wherein at least one of the multiple processors is configured to enable the system to capture the packets at full payloads at line rate in real time.

7. A system that enables launching a cyber-offensive countermeasure on a network, the system comprising:
   a memory,
   multiple processors, at least one of the multiple processors being configured to enable the system to:
   receive packets routed on the network and analyze the received packets to detect an attack directed toward a device on the network when the attack is external to the device,
   divide the received packets into at least a first thread associated with a first one of the multiple processors and a second thread associated with a second one of the multiple processors,
   edit the received packets, and
   transmit the edited packets on the network, wherein
   the first one of the multiple processors is associated with a database of filters used to analyze the packets and the database of filters is not shared by the second one of the multiple processors, and wherein
   when the system detects an attack, the system attributes the attack to a source and triggers a countermeasure to suppress the attack, and the counter-measure comprises at least one of slowing the source, watching the source over time, or stopping the source.

8. The system of claim 7, wherein the countermeasure comprises at least one of flow termination, jamming, botnet capture, disinformation, DNS request capture, rewriting of DNS request to reroute traffic away from an identified botnet, or taking control of a botnet threat to turn it into an attacker to a source botnet controller.

9. The system of claim 1, wherein the system is deployed independently or as a cluster on the network.

10. A method of providing a cyber-offensive countermeasure on a network, implemented on a computer-readable medium on a server connected to the network, the method comprising:

capturing packets routed on the network, dividing the received packets into at least a first thread associated with a first processor and a second thread associated with a second processor, analyzing the captured packets to detect an attack directed toward a device on the network when the attack is external to the device, editing the captured packets, and transmitting the edited packets on the network, wherein the first processor is associated with a database of filters used to analyze the packets and the database of filters is not shared by the second processor.

11. The method of claim 10, comprising editing packet content to suppress an attack.

12. The method of claim 11, comprising deconstructing packet content and reconstructing patent content before editing packet content.

13. The method of claim 11, comprising further editing packet content so that the editing of packet content is not recognizable by the network.

14. The method of claim 13, comprising further editing of packet content by reordering the transmission control protocol (TCP) sequence numbers and checksums.

15. The method of claim 10, wherein the method is implemented on a cluster of devices on the network.

16. A cyber-offensive security system that enables a network platform to launch a cyber-offensive countermeasure, the system comprising multiple processors, at least one of the multiple processors being configured to enable the system to:

receive packets routed on the network and analyze the received packets to detect an attack directed toward a device on the network when the attack is external to the device, divide the received packets into at least a first thread associated with a first one of the multiple processors and a second thread associated with a second one of the multiple processors, edit the received packets, and transmit the edited packets on the network, wherein the first one of the multiple processors is associated with a database of filters used to analyze the packets and the database of filters is not shared by the second one of the multiple processors.

\* \* \* \* \*